May 22, 1928.
R. E. DAY
ALUMINUM ALLOY PISTON
Filed June 17, 1927
1,670,956
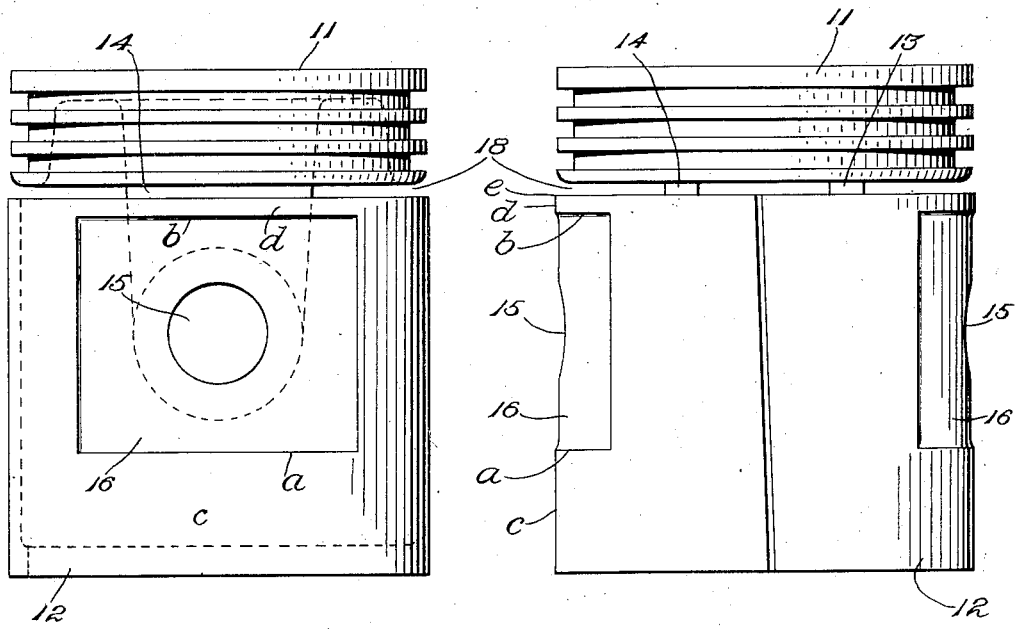

Patented May 22, 1928.

1,670,956

UNITED STATES PATENT OFFICE.

RAY E. DAY, OF SEATTLE, WASHINGTON.

ALUMINUM ALLOY PISTON.

Application filed June 17, 1927. Serial No. 199,591.

My present invention relates to light alloy pistons such as are commonly employed in internal combustion engines at the present time. I have found as the result of long practical experience that these pistons and particularly those of the type having a skirt and head separated from each other by a horizontal slot, the two being integrally connected by hanger members each extending downwardly from the inside of the head of the inwardly extending piston pin bosses and which have relieved areas about the ends of the piston pin bosses that certain definite troubles result from the presence of the relieved areas. These difficulties are two. First. The lands of the head are of less diameter than the skirt and the skirt about the piston pin is relieved to a point considerably below the piston pin; consequently, there is no bearing in the plane of the axis of the piston pin form the point at the bottom of the relieved area to the top of the piston, there is a tendency of the piston to cock or tilt in the cylinder particularly if the connecting rod is slightly bent and there is nothing on the piston itself to resist this tendency. This difficulty is particularly noticeable when the pistons are inserted in the engines by persons who are not skilled in the work. It will be understood that replacement pistons are consequently furnished to small garages in the country or even to owners of automobiles and that the persons who install them have frequently practically no experience and, therefore, do not know whether the piston is correctly installed or not. Such workmen are apt, particularly if the connecting rod is bent, to get the piston in in a slightly tilted position, which position it tends to maintain subsequently and consequently to score the cylinder and produce undue wear. When a piston is installed in this position, the rings tend to wear round on their upper and lower edges, to rotate on the piston, and they cease eventually to scrape the oil off the cylinder wall, and thereafter the piston "pumps oil" as it is commonly known. In the second place, I find that in pistons as ordinarily constructed, that is those which have a relieved portion about the piston pin which extends from a point below the piston pin upward to the horizontal slot separating the skirt from the head, the oil which is scraped off by the lower scraper ring accumulates in the relieved area and thereafter remains on the cylinder wall resulting in excessive oil consumption and other incidental troubles.

My present invention furnishes a bearing for the piston at a point about the piston pin and adjacent the under side of the horizontal slot and, therefore, prevents the piston being tilted when being placed in the cylinder and likewise furnishes a scraping edge for the oil and thus prevents over-lubrication of the cylinder wall at this point. The oil scraped off is returned to the inside of the piston.

The invention will be more fully understood from the following description when taken in connection with the accompanying drawing and the novel features thereof will be pointed out and clearly defined in the claim at the close of this specification.

Referring now to the drawings:

Fig. 1 is a side elevation of a piston embodying my invention.

Fig. 2 is a side elevation of the piston shown in Fig. 1, the view being at right angles to the position in Fig. 1.

Referring now to the drawings, at 11 is shown the head and at 12 the skirt of the piston the two being connected by hanger members 13 and 14 shown partly in dotted lines. These hanger members are preferably integral with the head and with the piston pin bosses, piston pin holes being shown at 15. Around each of the piston holes 15 is a relieved area 16. This relieved area extends from a point $a$ considerably below the piston pin hole 15 to a line $b$ shortly below the horizontal slot 18 which separates the skirt from the head. This leaves an unrelieved surface $d$ between the relieved area and the slot 18 which furnishes a bearing above the piston pin corresponding to the bearing furnished by the unrelieved area $c$ below the piston pin. This unrelieved area $d$ separates the relieved area 16 from the slot 18 and, therefore, furnishes a sharp